(12) United States Patent
Hiramatsu et al.

(10) Patent No.: US 6,626,607 B1
(45) Date of Patent: Sep. 30, 2003

(54) VEHICLE TEST COURSE SURFACE

(75) Inventors: Shozo Hiramatsu, Tokyo (JP); Hajime Taniwaki, Tokyo (JP)

(73) Assignee: Nippon Hodo Co., Ltd., Tokyo (JP)

( * ) Notice: Subject to any disclaimer, the term of this patent is extended or adjusted under 35 U.S.C. 154(b) by 0 days.

(21) Appl. No.: 09/580,134

(22) Filed: May 30, 2000

(30) Foreign Application Priority Data

May 31, 1999 (JP) .......................................... 11-151028

(51) Int. Cl.⁷ ................................................ G01C 7/00
(52) U.S. Cl. ........................................... 404/71; 405/61
(58) Field of Search ................... 239/2.2, 14.2, 239/693, 75; 404/1, 32, 2, 71; 405/217, 61

(56) References Cited

U.S. PATENT DOCUMENTS

| | | | | |
|---|---|---|---|---|
| 2,800,456 A | * | 7/1957 | Shepherd | |
| 3,645,177 A | * | 2/1972 | Hargett | 94/33 |
| 3,964,682 A | * | 6/1976 | Tropeano et al. | 239/2 |
| 4,440,520 A | * | 4/1984 | Fisher | 404/72 |
| 4,549,364 A | * | 10/1985 | O'Connor | 37/197 |
| 4,742,958 A | * | 5/1988 | Bucceri | 239/2.2 |
| 4,767,239 A | * | 8/1988 | Erwin | 405/217 |
| 5,073,612 A | * | 12/1991 | Irie et al. | 526/240 |
| 5,261,245 A | * | 11/1993 | Tanaka et al. | 62/59 |
| 5,792,855 A | * | 8/1998 | Yonemura et al. | 536/56 |
| 5,906,454 A | * | 5/1999 | Medico et al. | 404/32 |

OTHER PUBLICATIONS

Tranportation Research Center, Facility Tour, printed from Web site Apr. 22, 2002, 1 page.*
National Automotive Test Center, Dedicated Winter Test Facilities, Printed from Web site Apr. 22, 4004, 2 pages.*
National Automotive Test Center, Winter Test and Vehicle Dynamics Areas, Printed from Weg site Apr. 22, 2002, 2 pages.*

* cited by examiner

Primary Examiner—Thomas B. Will
Assistant Examiner—Raymond W Addie
(74) Attorney, Agent, or Firm—Dilworth & Barrese LLP.

(57) ABSTRACT

A vehicular test course surface is provided which permits tests to be conducted in a snow-covered road condition no matter in which season the tests may be conducted. Snow is made to fall or accumulate like artificial snow onto a road surface.

13 Claims, 1 Drawing Sheet

VEHICLE TEST COURSE SURFACE

FIELD OF THE INVENTION

The present invention relates to a vehicular test course surface.

BACKGROUND OF THE INVENTION

Vehicular test courses are used for testing the properties of vehicle bodies and tires, including high-speed circumferential courses, uneven courses, and low mu ($\mu$) courses. A low $\mu$ course surface is a smooth surface which permits the reproduction of braking conditions on frozen roads and snow-covered roads. With a low $\mu$ course surface, however, it is difficult to reproduce a road surface peculiar to a snow-covered road, as a sherbet-like road surface or a compressed snowy road surface; there is no choice but to conduct snowy road tests in the winter season, thus giving rise to the problem that the period for the research and development of vehicle bodies and tires is lengthened.

It is an object of the present invention to provide a test course surface which permits snowy road tests even in other seasons than the snowfall season.

Other objects of the present invention will become apparent from the following description.

SUMMARY OF THE INVENTION

According to the present invention, in the first aspect thereof, there is provided a vehicular test course surface obtained by making snow fall or accumulate on a road surface artificially.

The present invention, in the second aspect thereof, resides in the artificial snow fall or accumulation being effected by cooling a water-absorbing resin in a water-absorbed state.

The present invention, in the third aspect thereof, resides in the above vehicular test course surface being a low mu ($\mu$) road surface.

The present invention, in the fourth aspect thereof, resides in forming the above vehicular test course surface using a water sprinkling equipment for sprinkling water onto the road surface and cooling equipment for cooling the road surface.

The present invention, in the fifth aspect thereof, resides in providing the above vehicular test course surface with slots for recovering the water-absorbing resin.

According to the present invention there is provided a snow-covered road which permits vehicular test running even in other seasons than the snowfall season. The vehicular test course surface as referred to herein indicates a test course surface on which vehicles are allowed to travel to test bodies of the vehicles or properties of tires, or an experiential driving course surface such as in a driving school or the like.

DETAILED DESCRIPTION OF THE INVENTION

Figure 1:
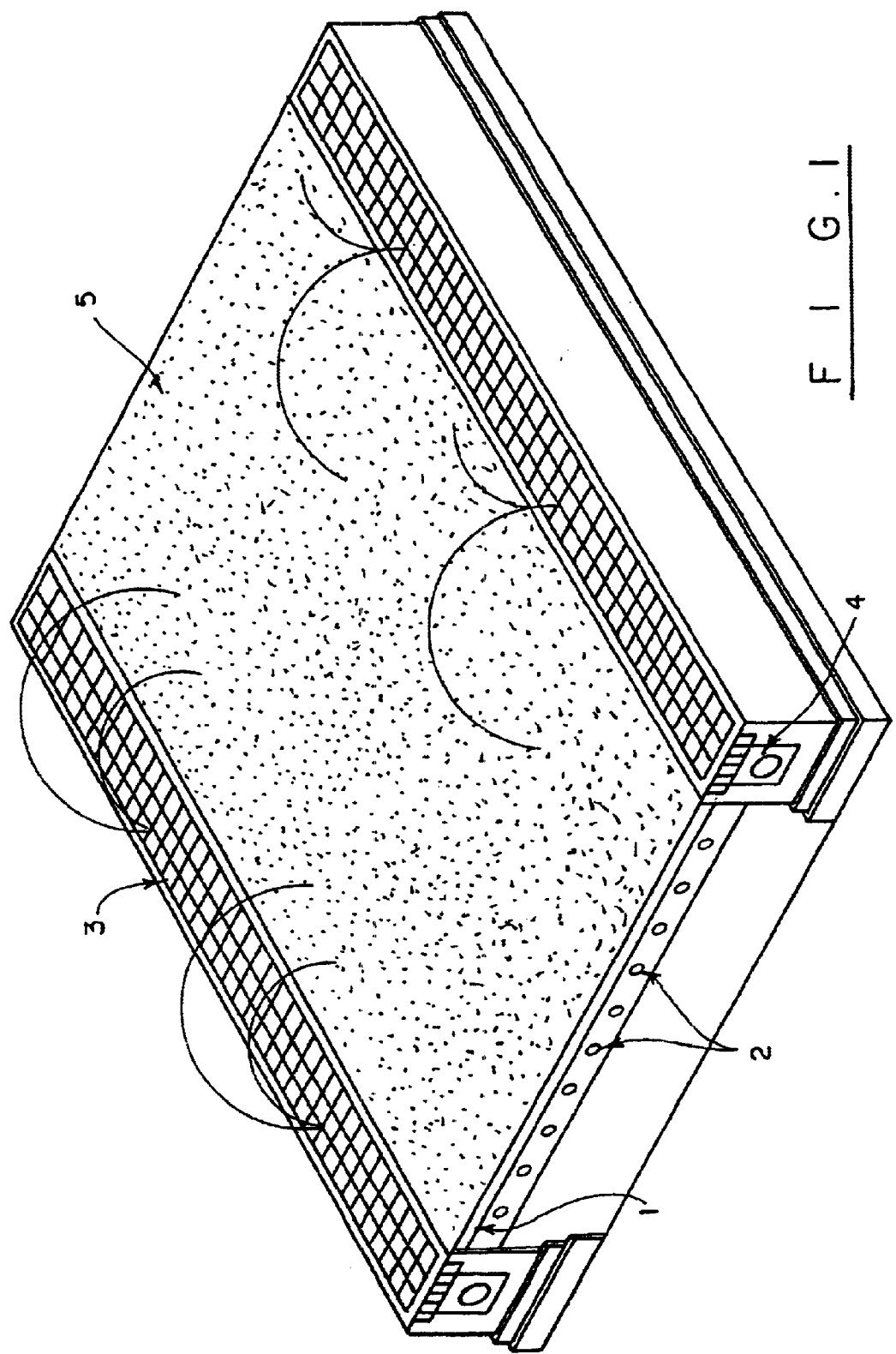
FIG. 1 is a sectional view showing an example of a vehicular test course surface according to the present invention, in which the reference numeral 1 denotes a paved road surface, the numeral 2 denotes a pipe for installation of a cooling equipment, numeral 3 denotes a spraying/water sprinkling equipment, numeral 4 denotes a recovery slot, and numeral 5 denotes a snow-fall or -accumulated layer.

In the present invention, a snow-covered road surface is formed by making snow fall or accumulate on a road surface artificially. Such artificial snow can be obtained by using an artificial snow producing/sending machine, by crushing ice lumps, by freezing a water-absorbing resin in a water-absorbed state, or a combination thereof, in addition to natural snow. Although it is only in the snowfall season that one can obtain natural snow, natural snow is most preferred for the reproduction of snowfall. It is possible to store natural snow in a freezer equipped with a humidity adjusting device and use it as a snowfall material whenever desired. If there is a high mountain near a test course, it is possible to convey snow from the high mountain to the test course even in early summer and utilize it in forming a snow-covered test course. However, the snow in early summer contains much water and is not suitable as snow for testing a snow-fall road or a fresh snow road, but is utilized as a material for forming a compressed snow road surface or a sherbet-like road surface.

Using an artificial snow producing/sending machine, artificial snow is obtained by sprinkling water at a high pressure while cooling the water at an atmospheric temperature below the freezing point. As cooling methods, there are known a method which utilizes an adiabatic expansion of compressed air and a method which utilizes chilled air produced by a refrigerating machine. Artificial snow obtained by an artificial snow producing/sending machine and artificial snow obtained by crushing ice lumps both constitute fine ice flakes containing water and which are, like granular snow, not suitable for the reproduction of snowfall. However, the artificial snow is an effective material for reproducing a snow-covered road surface especially in any other season than the snowfall season, thus permitting easy production of a material for the accumulation of snow.

In the present invention it is particularly preferred to use an artificial snow formed by using a water-absorbing resin. Water-absorbing resins are broadly classified mainly into starchy, cellulosic, and synthetic polymer resins. Starchy and cellulosic resins are classified into graft polymer type and carboxymethyl type, respectively. Synthetic polymer resins are classified into polyacrylates, polyvinyl alcohols, polyacrylamides, and polyoxyethylenes, with polyacrylates being particularly preferred. Product forms of water-absorbing resins are roughly classified into amorphous powder, spherical granules, short fibers, long fibers, and films, with amorphous powder being preferred. Also preferred are those resins with inorganic substances such as attapulgite, talc, diatomaceous earth, and kaolin incorporated therein, those resins whose particle surfaces have been enhanced in crosslinking density, those resins with water-repellent silicone resins or polyvinyl alcohols applied to their surfaces, and combinations thereof, making aggregation and bonding of water-absorbed resins difficult to occur.

Artificial snow using such a water-absorbing resin can be obtained by allowing the resin to absorb water and freezing the water-absorbed resin. Particularly, artificial snow with reduced aggregatability and bondability of resin particles as referred to above is preferred, because it can be adjusted to a specific gravity and water content also suitable for a snowfall test. The artificial snow in question can retain a fresh snow accumulated state for a longer period of time than the artificial snow obtained by an artificial snowing machine. There accrues an advantage that the artificial snow in question does not easily assume a state of granular snow or Eisbahn (a frozen road surface). The artificial snow using a water-absorbing resin is further advantageous in that a sherbet-like road surface can be reproduced easily. Thus, such artificial snow exhibits properties closely resembling the properties of natural snow.

In the present invention, the above natural snow or artificial snow is allowed to fall or accumulate onto a test course surface. For making snow fall there is used a snow sending equipment. In the case where artificial snow is to be produced and made to fall at the same time, the foregoing artificial snow producing/sending machine is used. The artificial snow sending equipment blows off compressed air with snow mixed therein and reproduces a snow falling state. The snow producing/sending equipment is made up of a feed snow hopper, a feeder for feeding the feed snow up to a feed snow introducing port, an air compressor, and a wind tunnel extending from the air compressor up to a blow-off port through the material introducing port. Cold-maintaining means is provided in each of these components. Since this equipment is for making natural or artificial snow fall, it is not necessary that the atmospheric temperature be below the freezing point as in the artificial snow producing/sending machine. However, when the atmospheric temperature is high, it is preferable to cool the compressed air. For cooling the compressed air it is desirable that the wind tunnel be cooled over the entire length thereof using dry ice or liquid nitrogen.

The accumulation of snow in the present invention is obtained by laying natural or artificial snow in the form of a road surface. In this case it is preferred that the road surface be adjusted at a temperature below the freezing point or thereabout by means of cooling equipment. For obtaining the accumulation of snow there usually is adopted a method wherein snow is placed and leveled directly on a road surface or a method wherein snow is accumulated by making snow fall as described above. But in the case of using a water-absorbing resin, artificial snow can be produced on such a road surface provided with cooling equipment as described above; in this case it is also possible to obtain the accumulation of snow. To be more specific, there may be adopted, for example, a method in which a water-absorbing resin is spread onto a cooled road surface and then water is sprinkled onto the road surface.

A water-absorbing resin in a state of gel can be utilized in a method wherein the water-absorbing resin, which has been cooled and gelled, is sprayed together with compressed air from a snow producing nozzle cooled with dry ice or the like to obtain artificial snow. According to this method, if the nozzle is disposed adjacent a test course surface, it is possible to make snow fall and accumulate easily. Since a water-absorbing resin which has absorbed water is used in this method, the resin can be used repeatedly insofar as it can be recovered after test. For this reason it is preferable that the snow-fall or -accumulated road surface formed by this method be provided with cooling equipment for the road surface, the nozzle adjacent to the road surface, and water-absorbing resin recovery equipment.

FIG. 1 is a sectional view showing an example of a snow-fall or -accumulated road surface according to the present invention, in which the reference numeral 1 denotes an ordinary paved road surface for a test course such as a conventional asphalt concrete road surface or concrete road surface, numeral 2 denotes a pipe which permits installation of a cooling equipment, numeral 3 denotes a spraying/water sprinkling equipment, numeral 4 denotes a recovery slot, and numeral 5 denotes a snow-fall or -accumulated layer of a water-absorbing resin.

A suitable road surface is used such as a conventional asphalt concrete road surface or concrete road surface. As a concrete example there is mentioned a low $\mu$ road surface such as a granolithic paved road surface or basalt tile road surface. On a conventional low $\mu$ road surface, a test is conducted while sprinkling water onto the road surface, allowing a frictional force between tires and the road surface to be diminished by a thin water film. In the present invention, since snow itself is used, it is not necessary to use a low $\mu$ road surface nor is it necessary to sprinkle water for a test. But if a low $\mu$ road surface is used in the present invention, it is possible to reproduce a fresh snowfall condition on Eisbahn (a frozen road surface), which is suitable for testing snowy road tires or an ABS (antilock brake system).

EXAMPLE

There was used the road surface shown in FIG. 1, which was provided with a recovery slot and spraying/water sprinkling equipment and further provided with cooling pipes under the concrete surface as a skin layer. A polyacrylic acid polymer having a water absorption rate of 30~50% was spread onto the road surface and misty water was sprinkled thereon to form a sherbet-like road surface.

The following effects are attained by the present invention.

Since a snow-covered road surface is obtained even in any season than the snowfall season, the period for research and development of a vehicle body or tire to be tested is shortened.

Since a water-absorbing resin is used as a feed material or artificial snow, there is obtained a road surface covered with snow which closely resembles natural snow.

Since cooling equipment is provided in the road surface obtained, the accumulation of snow can be maintained in a predetermined test time, thus affording highly accurate test data.

Since a water-absorbing resin spraying equipment is provided in the road surface, the falling of snow can be reproduced and it becomes possible to effect an experiential snowy road running.

Since water-absorbing resin recovery slots are formed in contact with the road surface, the resin can be utilized repeatedly, thus making it possible to conduct an economical test.

What is claimed is:

1. A vehicular test course surface obtained by making snow fall or accumulate on an asphalt concrete or concrete road surface artificially, using a water sprinkler equipment for sprinkling water onto the road surface and cooling equipment for cooling the road surface, wherein the artificial snow fall or accumulation is effected by cooling a water-absorbing resin in a water-absorbed state, the water-absorbing resin is selected from the group consisting of graft polymer type or carboxymethyl polymer type starchy polymer resins, graft polymer type or carboxymethyl type cellulosic polymer resins, polyacrylates, polyvinyl alcohols, polyacrylamides and polyoxythylenes, in the form of amorphous powder, spherical granules, short fibers, or films, and at least one of water-repellant silicone resin and polyvinyl alcohol is applied to surfaces of the water-absorbing resin by coating.

2. The surface in accordance with claim 1, wherein the road surface is a low mu ($\mu$) road surface.

3. The surface in accordance with claim 1, which is provided with slots for recovering water-absorbing resin.

4. The surface of claim 1, wherein the water-absorbing resin is selected from at least one of polyacrylates, polyvinyl alcohols, polyacrylamides and polyoxyethylenes.

5. The surface of claim 1, wherein the resin additionally comprises an inorganic substance selected from at least one of attapulgite, talc, diatomaceous earth, and kaolin.

6. The surface of claim 4, wherein the resin additionally comprises an inorganic substance selected from at least one of attapulgite, talc, diatomaceous earth, and kaolin.

7. The vehicular test course surface as set forth in claim 1, comprising a paved asphalt concrete or concrete road surface (1),
- piping (2) situated to run underneath said paved road surface (1) and allowing installation of cooling equipment,
- spraying/water sprinkling equipment (3) situated along lateral sides of said paved road surface (1), and
- a recovery slot (4) also situated on either side of said paved surface (1) adjacent said respective sprinkling equipment (3).

8. A vehicular test course surface as set forth in claim 1, comprising a test course surface (1) structured and arranged to permit vehicles to travel on a snow-covered road surface thereon to test the vehicles or properties thereof in a season other than snowfall season.

9. A vehicular test course set forth as in claim 5, comprising a test course surface (1) structured and arranged to permit vehicles to travel on a snow-covered road surface thereon to test the vehicles or properties thereof in a season other than snowfall season.

10. A vehicular test course surface obtained by making snow fall or accumulate on an asphalt concrete or concrete road surface artificially, wherein the artificial snow fall or accumulation is effected by cooling a water-absorbing resin in a water absorbed state, the water-absorbing resin is selected from the group consisting of graft polymer type or carboxymethyl polymer type starchy polymer resins, graft polymer type or carboxymethyl type cellulosic polymer resins, polyacrylates, polyvinyl alcohols, polyacrylamides and polyoxythylenes, in the form of amorphous powder, spherical granules, short fibers, or films, the resin additionally comprising an inorganic substance selected from at least one of attapulgite, talc, diatomaceous earth and kaolin, and additionally comprising at least one of water-repellant silicone resin and polyvinyl alcohol applied to surfaces of the water-absorbing resin by coating.

11. A vehicular test course surface as set forth in claim 10, wherein the road surface is a low mu ($\mu$) road surface.

12. A vehicular test course surface as set forth in claim 10, which is provided with slots for recovering the water-absorbing resin.

13. The vehicular test course road surface as set forth in claim 10, comprising a paved asphalt concrete or concrete road surface (1),
- piping (2) situated to run underneath said paved road surface (1) and allowing installation of cooling equipment,
- spraying/water sprinkling equipment (3) situated along lateral sides of said paved road surface (1), and
- a recovery slot (4) also situated on either side of said paved surface (1) adjacent said respective sprinkling equipment (3).

* * * * *